(12) United States Patent
Hinnant, Jr. et al.

(10) Patent No.: US 7,948,915 B2
(45) Date of Patent: May 24, 2011

(54) REMOVING TIME TAG JITTER AND CROSSOVER DISTORTION

(75) Inventors: Harris O. Hinnant, Jr., Seattle, WA (US); Darin W. Brekke, Fox Island, WA (US); Mark A. Castelluccio, Kent, WA (US)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 12/245,572

(22) Filed: Oct. 3, 2008

(65) Prior Publication Data

US 2010/0085890 A1    Apr. 8, 2010

(51) Int. Cl.
*H04L 12/26* (2006.01)

(52) U.S. Cl. .................................... 370/253; 370/237

(58) Field of Classification Search .............. 375/271, 375/303; 341/34, 155
See application file for complete search history.

(56) References Cited

U.S. PATENT DOCUMENTS

| | | | | |
|---|---|---|---|---|
| 3,752,923 A | * | 8/1973 | Burke | 375/303 |
| 5,511,129 A | * | 4/1996 | Craven et al. | 381/103 |
| 6,683,492 B2 | * | 1/2004 | Krishnapura et al. | 327/552 |
| 6,794,930 B1 | * | 9/2004 | Nurminen | 330/10 |
| 6,968,014 B1 | * | 11/2005 | Bobier | 375/271 |
| 7,164,368 B1 | * | 1/2007 | Ireland | 341/34 |
| 7,307,585 B2 | | 12/2007 | Hinnant, Jr. et al. | |
| 7,733,224 B2 | * | 6/2010 | Tran | 340/540 |
| 2003/0058148 A1 | * | 3/2003 | Sheen | 341/155 |
| 2008/0031139 A1 | * | 2/2008 | Muro et al. | 370/237 |

\* cited by examiner

*Primary Examiner* — Thong H Vu
(74) *Attorney, Agent, or Firm* — Lee & Hayes, PLLC

(57) ABSTRACT

Techniques for removing time tag jitter and crossover distortion from a measurement system are described. A period or clock drift estimate is generated for each sensor, and the estimates are used to remove time tag jitter and detect and remove crossover distortion. This crossover distortion condition is common to measurement systems required to acquire and accurately time tag data from multiple sensors where the sensors produce data at an asynchronous periodic rate which may result in a distortion in time tag accuracy. These techniques are germane to aircraft and other systems that require precisely time correlated measurements from multiple sensors hosted by a data control system, and can obviate the use of real time operating systems and specialized hardware for this purpose.

20 Claims, 7 Drawing Sheets

REMOVING TIME TAG JITTER AND CROSSOVER DISTORTION

BACKGROUND

Accurate time correlation of data from different sensors is critical in the aircraft industry as a result of the high dynamics involved. For example, the navigation system of an aircraft traveling 1000 feet/second may have a 1 foot error as a result of a 1 millisecond time sync error in correlating inertial data to the Global Positioning System (GPS) measurements, although GPS measurements can be an order of magnitude more accurate. For many applications across a broad range of industries, accurate time correlation of data can be difficult and/or expensive to achieve with conventional approaches using custom hardware and real-time operating systems.

In the aircraft industry as well as other industries multiple sensors may be monitored by a single processor using the data to measure properties of a device, such as flexural properties of the wings of an aircraft. Multiple sensors may be employed to measure and determine differences between different portions or components of a system, such as the flexural and/or torsion state at different locations in an aircraft wing. In these examples, data measured at various time points are correlated for comparison with data collected from other sensors, and this is done in a common processor. These data acquisition systems apply time tags to data packets acquired by the sensors so the time tagged data may be interpolated to a common time frame for comparison.

There are numerous problems that may arise to adversely affect the correlation of time tagged data among sensors monitored by a single processor. For example, sensor clocks are known to drift with time. As the sensor clocks drift, there is a crossover period when one or more sensors generate data at nearly the same time. When one or more data packets arrive at the data acquisition processor while the processor has not completed time tagging the current data packet, each queued data packet will be tagged with a time bias error as it is processed, for which we use the term "crossover distortion." This resulting time tag indicates an arrival time later than when data actually arrived. Additionally, as the sensor clocks drift, the arrival of packets in the time tagging queue can switch order, creating discontinuities in the time tag bias error for each sensor.

SUMMARY

Systems and methods for removal of time tag jitter and crossover distortion are described herein, such that the need for custom hardware and real-time operating system solutions for real time data acquisition and time tagging is eliminated. The system may include two or more sensors that produce data at a periodic rate. The sensors may produce data asynchronously that, while output at precise intervals over the short term, drift slowly in time relative to one another over the long term. In one implementation, these incoming measurements are examined in a specialized data control system that estimates clock drift and/or period of each measurement stream. In such an example, the data control system determines a variable time window in which coincident measurements are expected to experience crossover distortion, identifies measurement streams in crossover condition and employs estimated clock drift and/or period, together with filtering techniques to remove the distortion (as well as jitter) from the time tag process.

In another implementation, an aeroelasticity measurement system includes a computer processor, a reference inertial measurement unit (IMU), and one or more measurement IMUs. Additionally, the system includes a data control system, which has a time tag module that applies a time tag to data received at the data control system. The system may also include a filtering module executing a filter that reduces the effects of time tag jitter and assists the data control system in detecting and removing the effects of crossover distortion for data received at the data control system from the reference IMU and/or the measurement IMUs.

The features, functions, and advantages that have been discussed above or will be discussed below can be achieved independently in various implementations, or may be combined in yet other implementations, further details of which can be seen with reference to the following description and drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
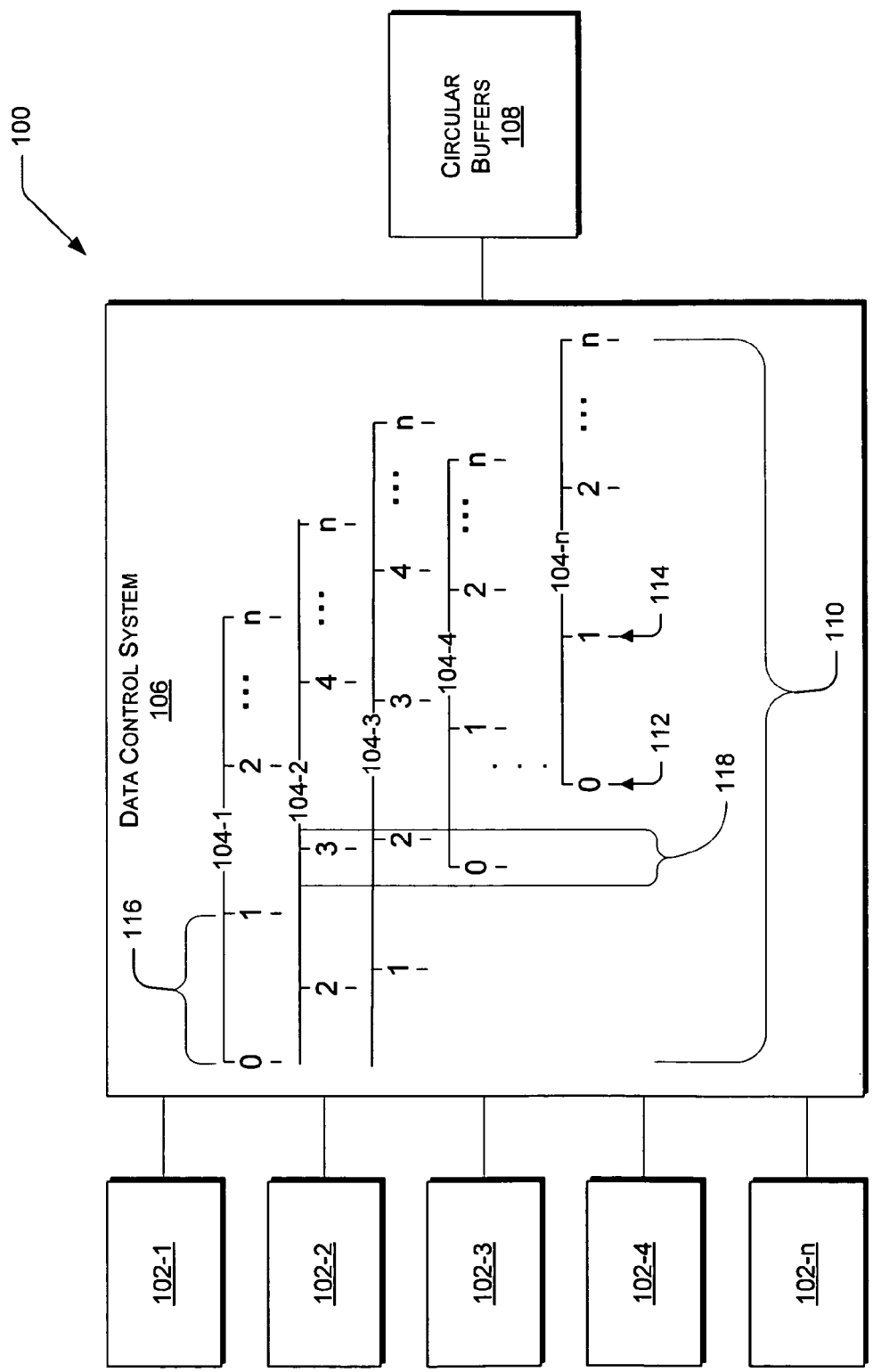
FIG. 1 is a block diagram of a measurement system with a plurality of inertial measurement units (IMUs) acquiring data asynchronously.

Methods disclosed herein remove data crossover distortion and in addition jitter which is due to typical processor time latencies. A specific example employing this method is an integrated aeroelasticity measurement system used to measure wing twist and body bending in air vehicles, in which a reference inertial sensor and one or more measurement inertial sensors are managed in a single processor using the method herein to precisely time correlate inertial and GPS measurements then process these to produce the aeroelasticity measurements.

According to one implementation, the systems and methods described herein relate to measurement systems with multiple sensors measuring events that are to be time-correlated by a common processor to a common time reference. Many applications require data-time correlation to be very accurate, often on the order of 10 microseconds or less. Application performance suffers if time correlation of data is distorted.

In time-correlating events, a time stamp or time tag may be applied to each event measured by sensors of a measurement system. The time tags may be referenced to a standard time keeping device, such as the GPS time standard. The measured events may be data packet streams and/or periodic events. The time tags may be applied by hardware or software. Computer processors have become powerful enough to implement algorithms on multiple data threads, and as they have done so, new problems have arisen in precise time correlation of these data streams.

A problem that arises when receiving multiple streams of sensor data at a processor is that the application of accurate time tags is corrupted by time tag jitter and crossover distortion. For example, the hardware and/or software of the measurement system may have latencies associated with random, pseudo-random, periodic and/or deterministic processes. There may be time tagging latencies due to transmission of data to be time tagged, due to time required to time tag an event, and/or due to multiple events occurring at the same time or at substantially the same time. Where the multiple events occur at the same time or substantially the same time a data crossover distortion condition occurs. For example, crossover distortion occurs when clocks of devices (such as IMUs or other sensors) providing data streams to the processor drift asynchronously, such that multiple devices are outputting data nearly simultaneously. When this occurs, the processor may delay time tagging one or more of the data packets, thus introducing a significant time tag error (herein termed "crossover distortion") degrading the subsequent performance of processing dependant on time tag accuracy.

There is a window of time (i.e., a "crossover window") in which multiple events begin to interfere with each other. That is, the time tagging process for these events experiences interference due to hardware and software processes already busy time tagging another event. In a system with many events (or data packet streams), more than two events may occur in this crossover window at once.

Real Time Operating Systems (RTOS) have been designed to guarantee a low latency response to data arrival, but RTOS are very expensive (by comparison to a non-RTOS) and typically serve to minimize latency, thus reducing jitter, but having no effect on crossover distortion. The system and methods described herein remove jitter and crossover distortion without the need for a RTOS for such measurement systems.

General Implementation

FIG. 1 is a block diagram of an illustrative measurement system 100 with a plurality of sensors 102 (102-1 through 102-n) for acquiring and transmitting data packets 104 (104-1 through 104-n) to a data control system 106 for processing. The plurality of sensors 102 is in communication with the data control system 106 wirelessly and/or via wired connections. In one implementation, the data control system 106 is in communication with circular buffers 108 to store the data packets and/or time tags for subsequent retrieval or analysis. In an alternative implementation, the data control system 106 includes the circular buffers 108, which are simply a mechanism for making available a swath of precisely time tagged data from the plurality of sensors.

In one implementation, the plurality of sensors 102 includes two or more sensors 102-1, 102-2, 102-3, 102-4, through "102-n". According to one implementation, the plurality of sensors 102 are asynchronous sensors, having their own clock module to determine timing of when they collect and transmit data. Thus, the sensors 102 may not start collecting/outputting data at the same time and/or the clocks may drift slowly relative to one another.

In an implementation, the sensors 102-1, 102-2, 102-3, 102-4, through "102-n" each output data packets 104-1, 104-2, 104-3, 104-4, through "104-n," respectively. The data packets 104 comprise measurements made by each of the sensors 102. In one example, the data packets may include aeroelasticity measurement data such as wing twist and deflection information. However, in other examples, the data packets may include other data that is measured.

In one implementation, the data packets 104 are transmitted to the data control system 106. The measurement system 100 as illustrated may include blocks, modules, processing logic, and circuits which are described in connection with the data control system 106. The data control system 106 may be implemented or performed using a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In one implementation, the data control system 106 may include a single or a multiple core processor. The data control system 106 receives streams of event/data packets 104, which it time tags. Time tags may be applied based on a processor clock of the data control system, or based on a time sync card that plugs into a processor bus and provides access to time tags referenced to an external sync pulse (e.g., GPS, Universal Time Coordinated, etc.). The data control system 106 may run a conditioning algorithm to remove jitter/crossover distortion from the streams of event/data packets 104. Conditioned data packets 104 are transferred to circular buffers 108, which may be accessible for subsequent analysis, feedback and/or any other post conditioning processing.

As illustrated in FIG. 1, the data packets 104 include a series of discrete measurements or events 110, denoted as 0, 1, 2 . . . "n", to be time correlated. Discrete measurements 110 have typical characteristics of a serial data stream. That is, they occur at a known frequency subject to an unknown variable clock drift that is small with respect to the known frequency. In one implementation, the discrete measurements 110 include an initialization 112 followed by at least one measurement 114. The data control system 106 may measure and analyze the period or time interval 116 between each discrete measurement. The time interval 116 between each discrete measurement may be used to analyze whether there is time tag jitter and/or crossover distortion resident in the measurements 110 contained in the data packets 104. For example, there may be an upper limit on the length of each time interval 116 between measurements. If the interval exceeds the upper limit, the data control system 106 may recognize the existence of time tag jitter or distortion.

FIG. 1 also illustrates a crossover window 118, which is a period of time where multiple sensors are simultaneously outputting data. This simultaneous output of data results in a data crossover distortion condition due to processor latency. More specifically, the crossover window 118 is any period of time, set and/or determined by the data control system 106, where the data packets 104 comprising discrete measurements 110 are close enough in time that the data control system 106 cannot immediately process and time tag the discrete measurements 110. This delay in processing and time tagging may lead to undesired inaccuracies in the time tags for the processed data packets 104.

In one implementation, the crossover window 118 size may be adjusted as a function of the number of devices/sensors 102 in crossover at any given time. For example, the greater the number of sensors involved in the crossover event, the larger the relevant crossover window will be. Data/events 104 within the crossover window 118 are either about to "collide" in time or have already "collided" and are drifting out of phase. Time tag crossover distortion occurs during this period.

FIG. 1 shows the device/sensor 102 event/data streams 104 offset in time to represent the fact they are turned on independently, initialized 112 and run asynchronously according to their own internal clock signals.

Figure 2:
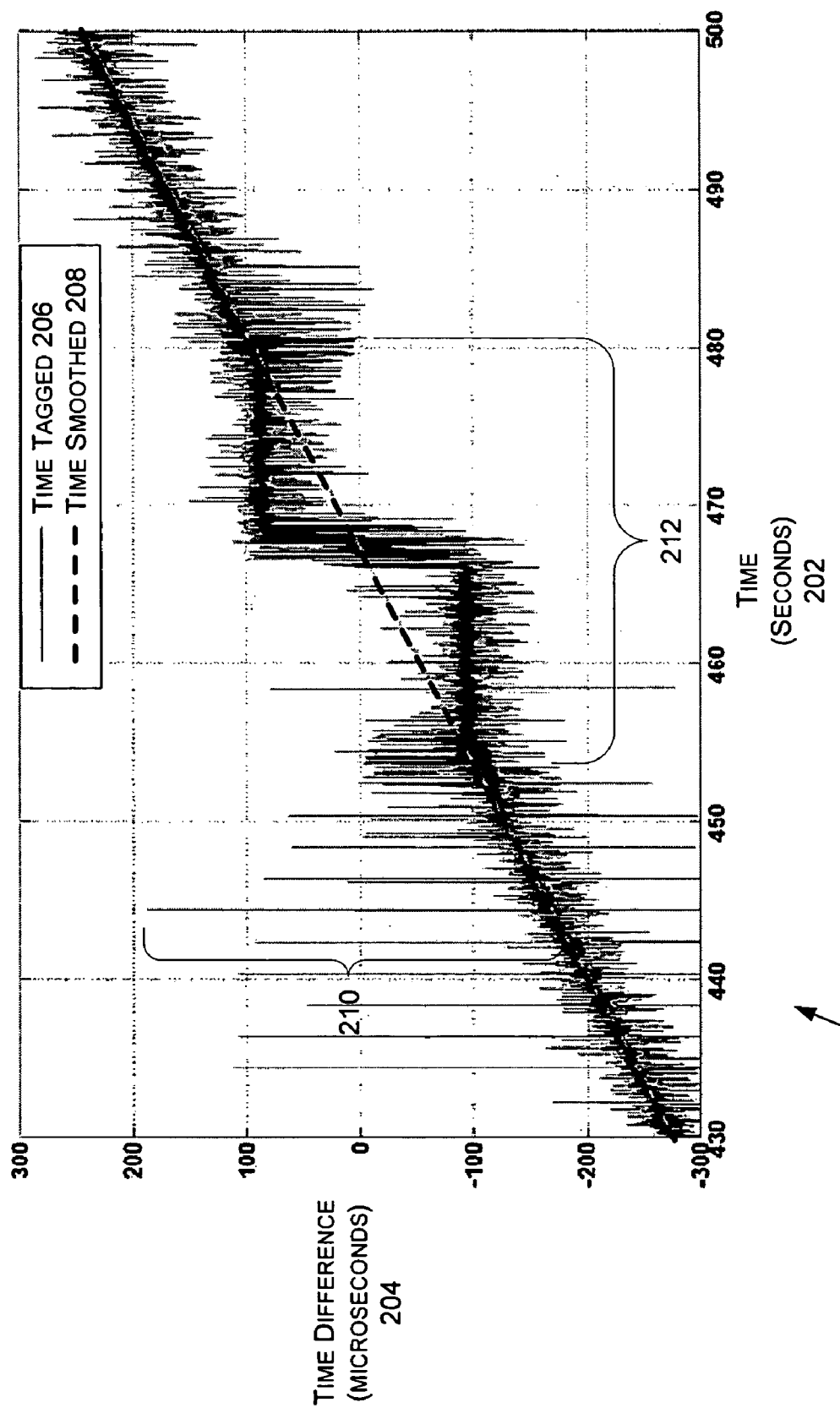
FIG. 2 is a plot showing differences of raw time tag data and conditioned time tag data over time.

FIG. 2 is a graphical representation of what occurs in crossover window 118 (for the case where two sensors are in crossover), depicting in plot 200 a time tag jitter and crossover distortion plot line, Time Tagged 206, and a conditioned time tag plot line, Time Smoothed plot 208. As two sensor clocks (e.g., clocks of sensors 102) drift in time, there is a "crossover" period when they generate data at the same time. As this happens, data from the sensors is collected by the data control system 106 sequentially. In data collection, the processor allocates hardware and software resources to a first data stream and then the second, third etc. imposing a time tag processing delay on these latter streams. This delay in collection of data from the second or subsequent sensors introduces the time tag distortion shown in the plot 200, specifically item 212. The plot is presented with an x-axis 202 representing time measured in seconds. The y-axis 204 of the plot 200 represents a measured time difference in micro-seconds. The plot 200 includes a difference plot line of Time Tagged 206 (i.e., the difference between actual time tags associated with individual data packets of two data streams, before, during and after a crossover distortion period, like unto that denoted by window 118 of FIG. 1) and a Time Smoothed plot 208, which is the difference of these two streams after their respective time tags have been filtered to remove jitter and crossover distortion. Without jitter and crossover distortion, the plot line of this difference should be a line with a slope representing the relative clock drift of the sensors, and this is what is effectively obtained, seen in Time Smoothed plot 208, after application of the conditioning algorithm.

In FIG. 2, item 210 represents time tag jitter in the time tagged plot 206. As shown, the time tag jitter 210 varies with time, and peak to peak jitter reaching 2 milliseconds has been observed in practical application of the Aeroelasticity Measurement System example described below. The Time Smoothed plot 208 is generated using a filter to smooth the vacillating nature of the time tag jitter 210, and the method described herein to detect and remove crossover distortion, represented by item 212. Item 212 indicates a portion, appearing as a stepped feature, of the Time Tagged plot 206 which includes crossover distortion. As indicated by item 212, the crossover distortion lasts for about 26 seconds. This plot 200 illustrates crossover distortion and time tag jitter measured between two sensors/devices for clarity (as opposed to the "n" sensors shown in FIG. 1). The conditioned result in Time Smoothed plot 208 is expected to reduce this error to less than 10 microseconds under normal conditions.

Example Removal of Jitter/Crossover Distortion

Figure 3:
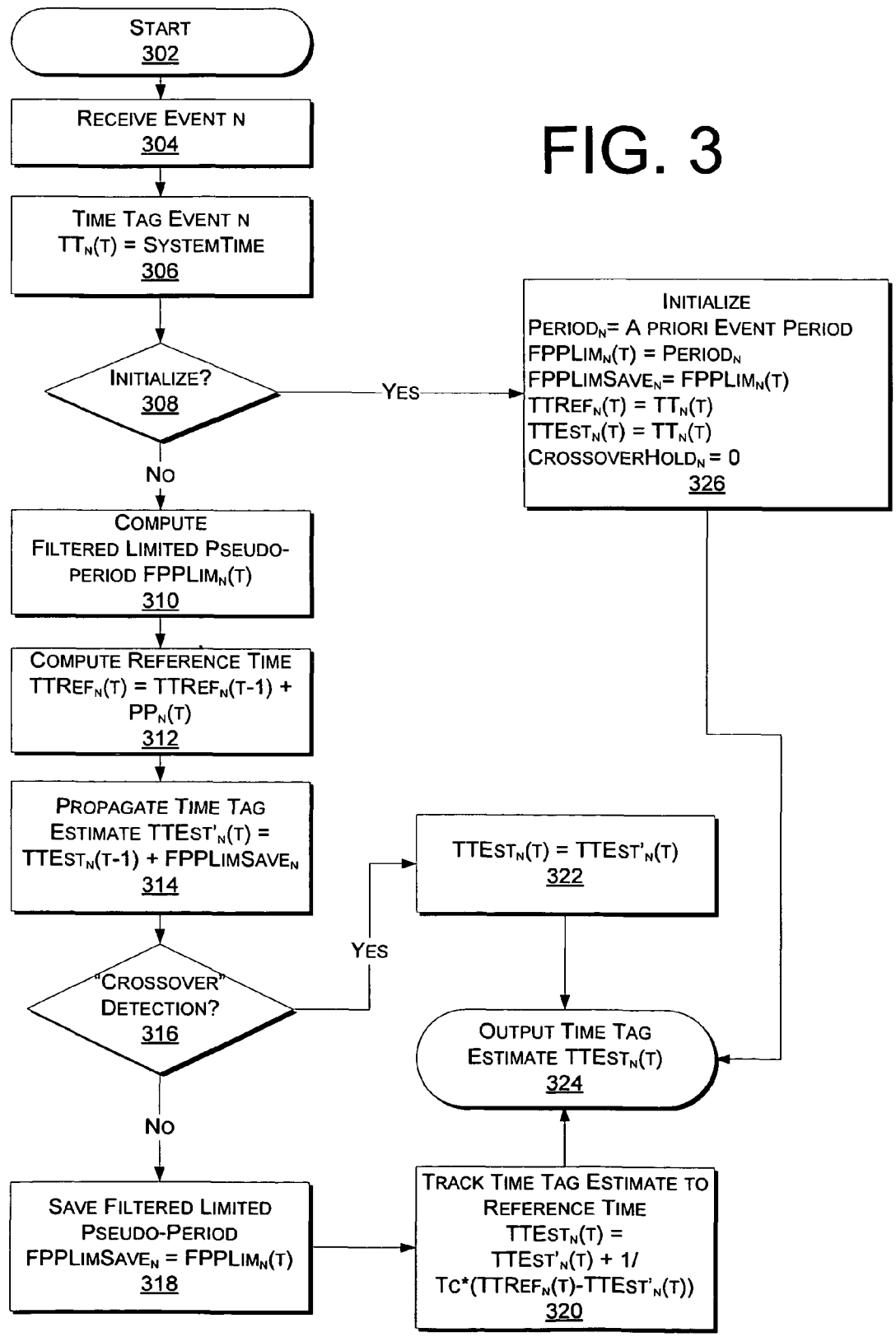
FIG. 3 is a flow diagram of an illustrative process for removing time tag jitter and crossover distortion from data.

FIG. 3 is a flow diagram of an illustrative process 300 for removing time tag jitter and crossover distortion from streams of event/data packets. For ease of illustration, the process 300 is described as being implemented using a system such as system 100. However, in other examples, the process 300 may be implemented using other systems.

At 302, the system 100 initializes the sensors 102 and a filtering algorithm executed by the data control system 106. In the initialization of 302, the system 100 uses a priori knowledge of event rates/intervals 116 to initialize the system 100 with the sensors 102 such that the algorithm is accurately configured. For example, as discussed above, the system 100 applies predetermined upper limits on the rates/intervals between sensor data packets. At 304, the data control system 106 receives a data packet 104, referred to as event "n", from sensor 102-n. At 306, the data control system 106 attaches a time tag to the data packet 104. In one implementation the time tag, $TT_n(t)$, is attached to the discrete measurement, whether it is the initial measurement 112 or a subsequent measurement 114. At 308, if event "n" is an initial measurement 112, processing branches to initialization at 326, otherwise, processing continues to compute a Filtered Limited Pseudo-Period at 310.

Note that the term pseudo period used herein practically equates to a method of estimating clock drift, since the period varies as a function of clock drift. An alternate implementation could be devised in which clock drift is directly estimated and employed in the process of removing crossover distortion.

At 326, additional initialization is performed to set parameters $Period_n$, $FPPLIM_n(t)$, and $FPPLimSave_n$ to the a priori event period 116 and to set parameters $TTRef_n(t)$ and $TTEst_n(t)$ to a current event time tag $TT_n(t)$ and a parameter CrossoverHold$_n$ is set to zero. Processing then continues to 324.

At 310, the data control system 106 computes the Filtered Limited Pseudo-Period, $FPPLim_n(t)$. Process 600, which computes the Filtered Limited Pseudo-Period, also referred to as Pseudo-Period Estimate, is further described below with reference to FIG. 6

At 312, the data control system 106 computes the Reference Time Tag, $TTRef_n(t)$, using the Pseudo-Period Estimate, $PP_n(t)$, from Process 600. Processing continues to 314.

At 314, the data control system 106 computes the Preliminary Time Tag Estimate, $TTEst'_n(t)$ by adding a Saved Filtered Limited Pseudo-Period, $FPPLimSave_n(t)$ to the previous Time Tag Estimate, $TTEst_n(t-1)$, output from 324. Processing continues to 316.

At 316, the data control system 106 determines a data crossover distortion condition exists between data packets 104 received at the data control system 106. The process of determining a data crossover distortion condition is further described below with reference to FIG. 4. If a crossover distortion condition exists, processing branches to 322, otherwise, processing continues to 318.

At 318, the data control system 106 saves the Filtered Limited Pseudo-Period, FPPLimn(t), as $FPPLimSave_n$ for subsequent use at 314. Processing continues to 320.

At 320, the data control system performs an act in the jitter reduction process where the Time Tag Estimate, $TTEst_n(t)$ is made to converge to the Reference Time, $TTRef_n(t)$, (the difference between the Time Tag Estimate and the Reference Time is termed the jitter residual) using a low pass filter, also referred to as a Tracking Filter, to drive out errors between the Preliminary Time Tag, $TTEst'_n(t)$, computed in 314 and the Reference Time Tag computed in 312. Processing continues to 324.

At 322, the Time Tag Estimate, $TTEst_n(t)$, is not updated as in 320. Instead the Time Tag Estimate, $TTEst_n(t)$, is equated to the estimate of 314. Essentially, it is propagated using the Filtered Limited Pseudo-Period of 310, thereby avoiding crossover distortion during this period.

At 324 Time-Tag Estimate $TTEst_n(t)$ is output and the process of removing time tag jitter and crossover distortion for this event is complete.

A wide variety of alternate filters could be implemented that replace the 1$^{st}$ order filter used in 320 with a higher order linear filter, Nth order or a Kalman filter that has a low pass characteristic.

Example of Determining Crossover Distortion Condition

Figure 4:
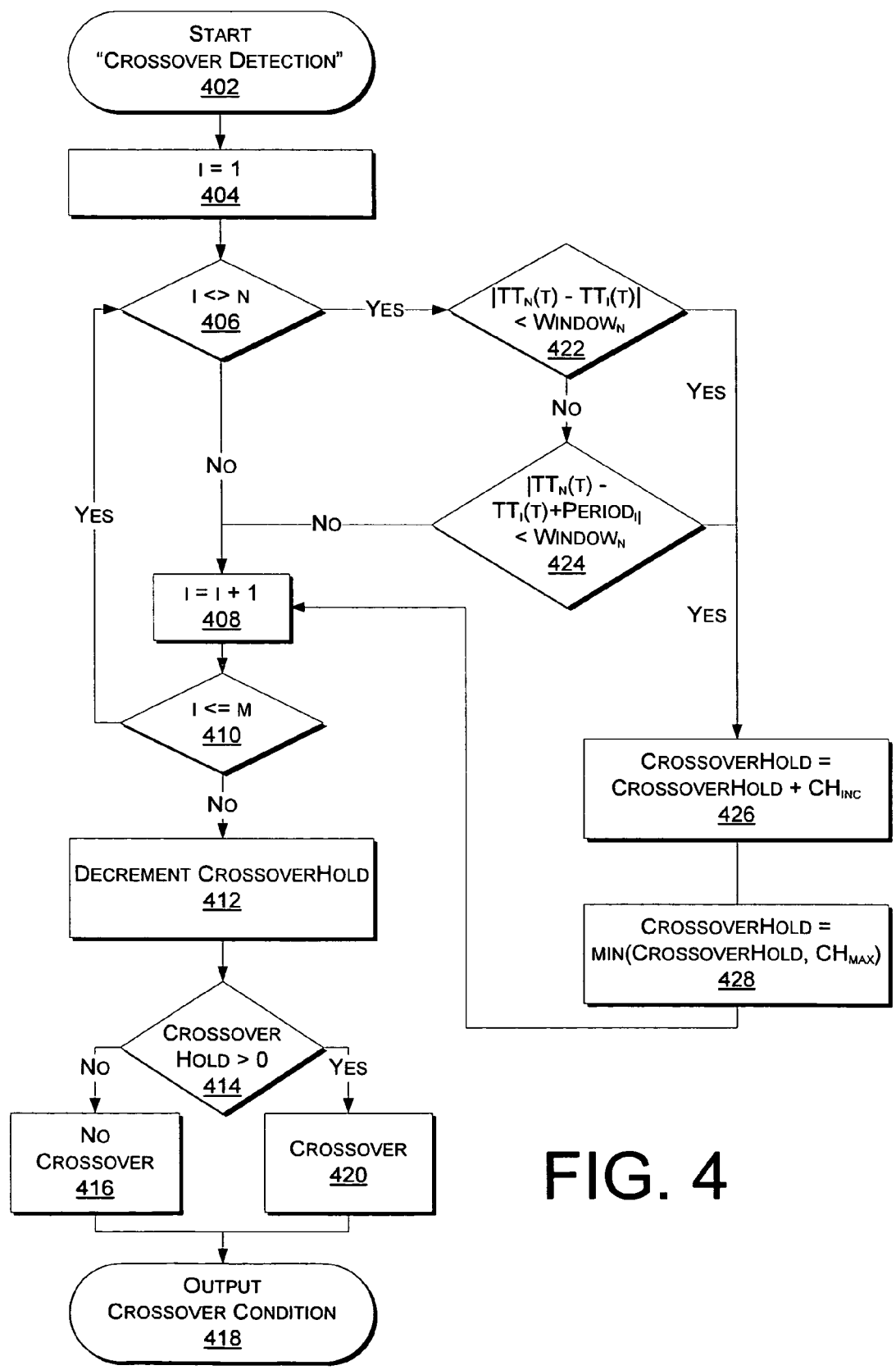
FIG. 4 is a flow diagram of an illustrative process for determining a data crossover distortion condition.

FIG. 4 is a flow diagram of an illustrative process for determining a data crossover distortion condition. At 402, the data control system 106 starts the processing to determine if a crossover distortion condition exists. At 404, a loop index, "i", is initialized and denotes the start of a process of looping through the "m" available sensor data packets. At 406, a condition is evaluated, if the loop index, "i", is not equal to the current data packet index, "n", then branch processing to 422, otherwise, continue processing at 408.

At 422, a condition is evaluated, if the absolute value of the time difference, $\Delta t$ (or Collision Residual), between the current time tag of the sensor "n" data packet, $TT_n(t)$, and the current time tag of the sensor "i" data packet, $TT_i(t)$, is less than the $window_n$, where $window_n$ is computed in process 500 (and described with reference to FIG. 5 below), the processing branches to 426, otherwise, processing continues to 424. At 424, a condition is evaluated, if the absolute value of the time difference, $\Delta t$ (or Projected Collision Residual), between the current time tag of then sensor "n" data packet, $TT_n(t)$, and the current time tag of the sensor "i" data packet, $TT_i(t)$ plus the period, $Period_i$, of sensor "i", is less than the $window_n$ the processing branches to 426, otherwise, processing continues to 408.

At 426, CrossoverHold is incremented by $CH_{inc}$. In one implementation, the value of $CH_{inc}$ is chosen to provide a short interruption of normal processing should a spurious crossover condition be detected. At 428, the value of CrossoverHold is limited to the value of $CH_{max}$. The value of $CH_{max}$ is chosen so that normal processing resumes after a sufficient period of time has elapsed to insure the crossover condition has ended. Processing continues to 408.

At 408, increment the loop index, "i", and continue processing to 410. At 410, a condition is evaluated, if the loop index, "i", is less than or equal to the number of data packets, "m", then branch to 406, otherwise, continue processing at 412.

At 412, the CrossoverHold variable is decremented. At 414, a condition is evaluated, if CrossoverHold is greater than zero then a crossover condition exists and processing branches to 420, otherwise, a crossover distortion condition does not exist and processing continues to 416. At 416 and 420, processing continues to 418. At 418, the result of the status of the crossover distortion condition is output.

Example of Computing Crossover Window

Figure 5:
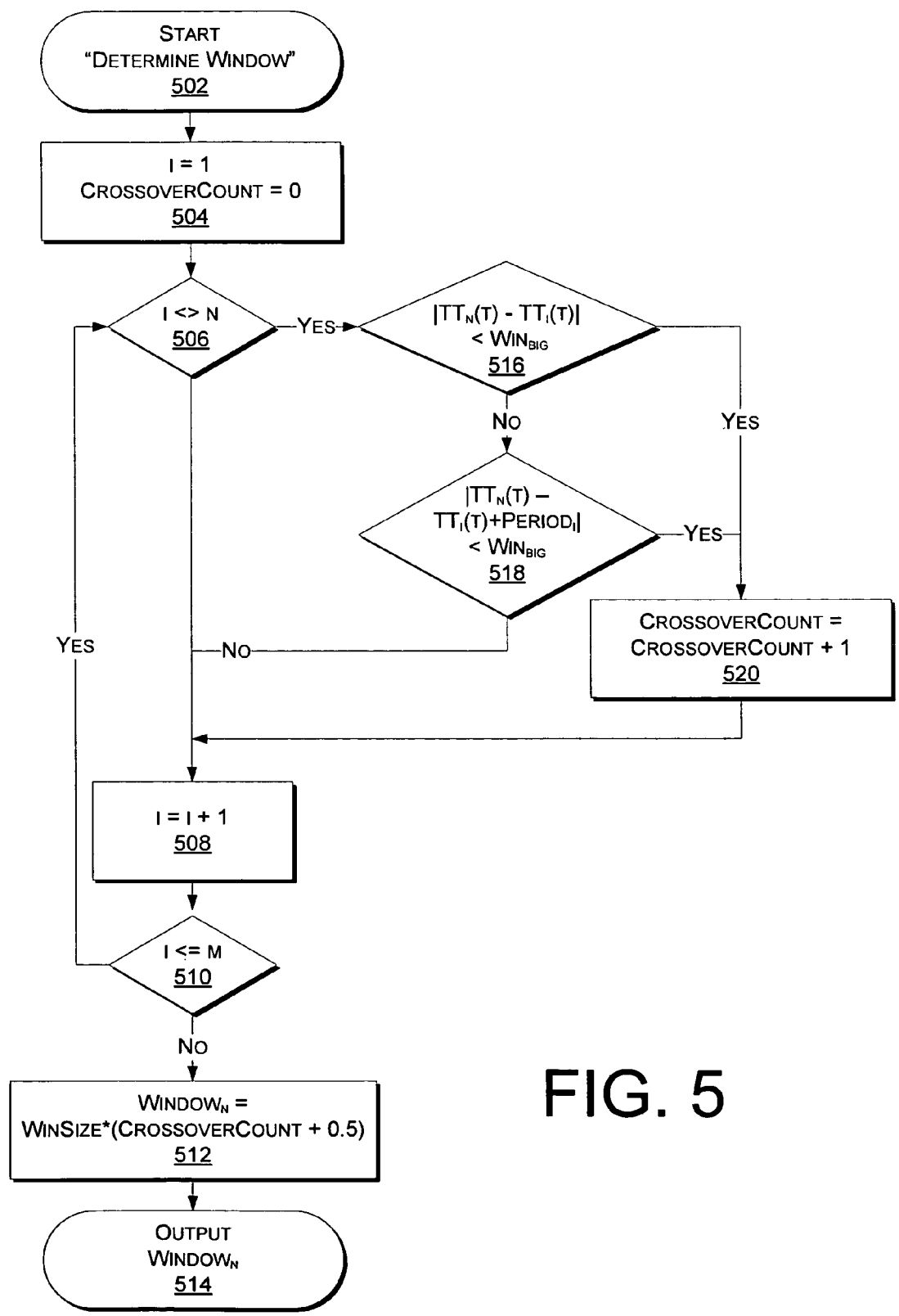
FIG. 5 is a flow diagram of an illustrative process for computing a crossover window.

FIG. 5 is a flow diagram of an illustrative process for computing the crossover window 118. At 502, the data control system 106 starts processing to determine the crossover window size. At 504, CrossoverCount is set to zero and a loop index, "i", is set to one. At 506, a condition is evaluated, if the loop index, "i", is not equal to the sensor index, "n", the processing branches to 516, otherwise, processing continues to 508. At 516, a condition is evaluated, if the absolute value of the time difference, $\Delta t$, between the current time tag of the sensor "n" data packet, $TT_n(t)$, and the current time tag of the sensor "i" data packet, $TT_i(t)$, is less than a value $Win_{big}$ then processing branches to 520, otherwise, processing continues to 518. $Win_{big}$ is chosen to encompass a time window sufficient to include the likely maximum size of the crossover distortion. At 518, a condition is evaluated, if the absolute value of the time difference, $\Delta t$, between the current time tag of the sensor "n" data packet, $TT_n(t)$, and the current time tag of the sensor "i" data packet, $TT_i(t)$ plus the period, $Period_i$, of sensor "i", is less than the $Win_{big}$ then processing branches to 520, otherwise, processing continues to 508. At 520, the CrossoverCount is incremented.

At 508, the loop index, "i", is incremented. At 510, a condition is evaluated, if the loop index, "i", is less than or equal to the number of sensors, "m", then processing branches to the top of the loop at 506, otherwise, processing continues to 512.

At 512, the window size, $window_n$, is computed as a function of the CrossoverCount and the parameter WinSize. The resulting window size, $window_n$, is output at 514.

Example of Computing the Filtered Limited Pseudo-Period

Figure 6:
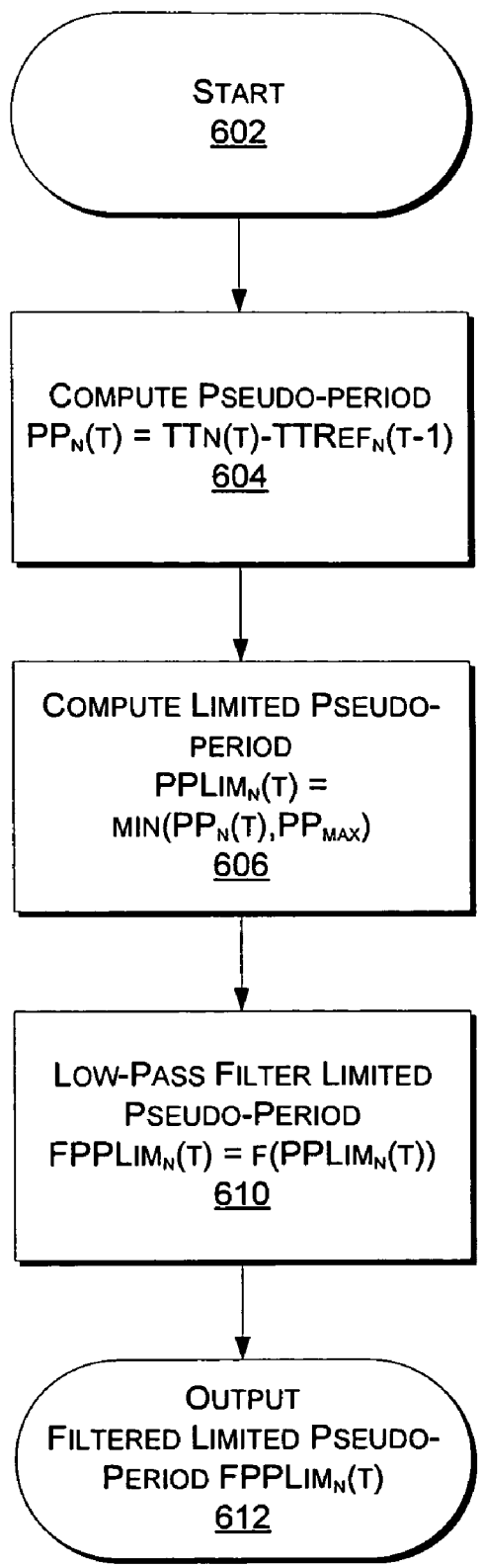
FIG. 6 is a flow diagram of an illustrative process for computing a filtered limited pseudo-period of an asynchronous sensor.

FIG. 6 is a flow diagram of an illustrative process for estimating clock periods 116 of an asynchronous sensor. At 602, the data control system 106 starts the processing to compute the filtered Limited Pseudo-Period, $FPPLim_n(t)$. At 604, the Pseudo-Period, $PPn(t)$ is computed as the difference between the current sensor time tag, $TTn(t)$ and the previous reference time tag, $TTRefn(t-1)$. At 606, the limited Pseudo-Period, $PPLim_n(t)$ is computed as the minimum of the Pseudo-Period, $PPn(t)$ and the parameter $PPmax$, where $PPmax_n$ is set to the largest period possible for sensor n. At 610, the Filtered Limited Pseudo-Period, $FPPLim_n(t)$, is computed by low-pass filtering the Limited Pseudo-Period, $PPLim_n(t)$. The Filtered Limited Pseudo-Period, $FPPLim_n(t)$ is output at 612.

Example Aeroelasticity Measurement Implementation

U.S. Pat. No. 7,307,585, issued on Dec. 11, 2007 in the name of Hinnant, Jr. et al. ("the '585 patent") describes an Integrated Aeroelasticity Measurement System requiring precisely time-correlated data streams. The time tag conditioning techniques described herein are applicable to the Integrated Aeroelasticity Measurement System of the '585 patent, to improve performance and accuracy of aeroelasticity measurements made by the system.

Figure 7:
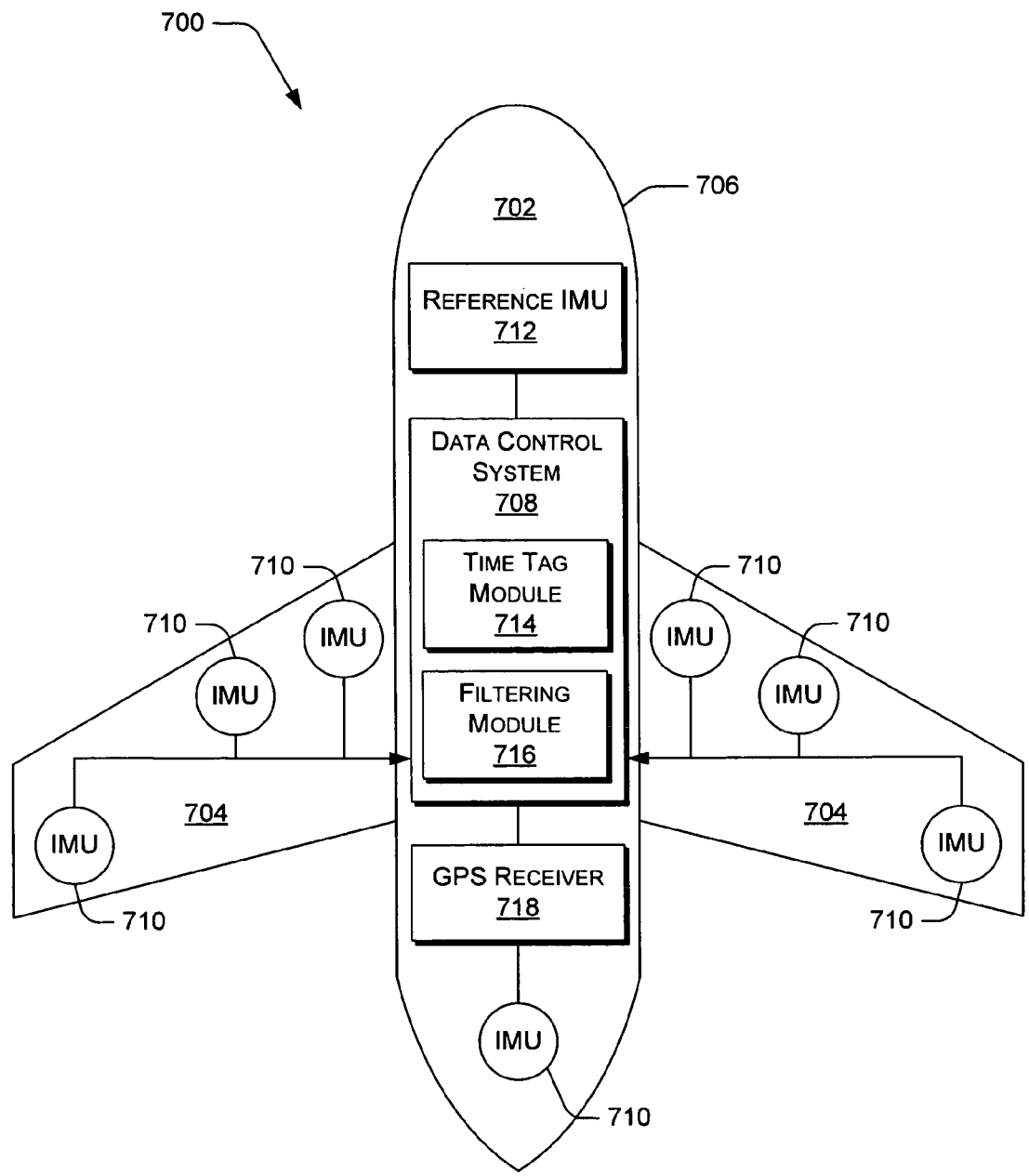
FIG. 7 is a schematic representation of an aircraft having an illustrative integrated system for measuring aeroelasticity of aircraft wings.

FIG. 7 is a schematic representation of an illustrative aeroelasticity measurement system 700 installed in an aircraft 702, to which the time tag smoothing techniques herein described have been applied. In the illustrated example, the aeroelasticity measurement system 700 is installed in the wings 704 and body 706 of the aircraft 702. The aeroelasticity measurement system 700 is one of many specific applications of the jitter and crossover distortion removal techniques described herein.

In the implementation of FIG. 7, the aeroelasticity measurement system 700 employs a data control system 708 to collect data from measurement IMUs 710 located at various measurement points of interest on an aircraft, such as the wings, tail, nose, etc. The system also collects data from a reference IMU 712, which is located at a reference location within the aircraft 702, such as in the aircraft fuselage. The data control system 708 includes time tag conditioning functionality, for a non-limiting example see the data control system 106 described in FIG. 1 herein. This time tag conditioning functionality is illustrated in FIG. 7 by the time tag module 714 and the filtering module 716 of the data control system 708.

Generally, the aeroelasticity measurement system 700 treats the reference IMU 712 as a fixed reference point that is not subject to twisting, bending, or displacement during flight. The reference IMU 712 is the point against which twist is to be measured. The example system also collects data from a GPS receiver 718 and uses it to provide a common time standard as well as accurate updates to a reference navigation solution from the reference IMU 710. A navigation solution consists of precisely time tagged position, velocity and attitude data, among other related elements.

The measurement technique described in the '585 patent applies known aided inertial navigation and stochastic alignment and flexure estimation algorithms, which require precisely time-correlated measurement data in the highly dynamic aircraft environment. The example measurement system described in the '585 patent implements a multiplicity of navigation systems in one processor and by so doing may benefit from the application of techniques described herein.

For example, in the aeroelasticity measurement system 700 of FIG. 7, a multiplicity of navigation systems derived from different inertial sensors whose data streams are time tagged in the data control unit 708. This aeroelasticity measurement system 700 provides an example of systems that benefit from the time tag conditioning techniques described herein.

Using the techniques described herein, the aeroelasticity measurement system 700 determines whether there are inaccuracies in the time tagging of the data acquisition process. For example, the data control unit 708 of the aeroelasticity measurement system 700 implements methods for determining crossover distortion and time tag jitter in the data and removing, smoothing, or otherwise conditioning such discrepancies from the data.

According to one implementation, the aeroelasticity measurement system 700 is a diagnostic system that can be installed in the aircraft 702 to collect in-flight test data. The data control system 708 in practice is implemented using a non-real-time operating system, a direct result of use of the time correlation methods described herein.

In an implementation of system 700, the data control system 708 operates as a data collection point and an integrated data processing component for the system 700. The data control system 708 implements processing threads that collect and process inertial measurement unit data into navigation solutions, from the reference IMU 712 and each measurement IMU 710. In addition, the data control system 708 implements a processing thread collecting GPS measurements used by navigator threads to do GPS/inertial navigation. Navigator threads are the processing threads requiring precisely time-correlated data. Using the reference GPS/inertial navigation solution derived from the reference IMU and GPS measurements from the GPS receiver 718, the data control system 708 resolves wing twist and/or wing deflection with respect to data streams from each measurement IMU 710. Additional details of the collection of wing twist and deflection data can be found by reference to U.S. Pat. No. 7,307,585, issued on Dec. 11, 2007 in the name of Hinnant, Jr. et al., which is incorporated herein by reference.

As the wing twist and deflection data is collected, the data control system 708 time tags the data packets making up the IMU data and conditions the data to remove jitter and crossover distortion, using techniques such as those described above with reference to FIGS. 1-7. More specifically, the time tag module 714 implements the processing described above with reference to FIG. 3 in conjunction with filtering module 716, which implements the filter processing described above with reference to FIGS. 3-6. Applying these time tagging and filtering techniques to the system of FIG. 7, the time tag module 714 receives data threads from the reference IMU 712 and from the measurement IMUs 710. The time tag module 714 applies time tags to data threads received at the data control system 708 based on a time sync card that plugs into the processor bus and provides access to time tags referenced to an external sync pulse from a GPS receiver 718. The filtering module 716 removes time tag jitter and crossover distortion from data received at the data control system 708 from the reference IMU 712 and from the measurement IMUs 710.

While at least one example implementation has been presented in the foregoing detailed description, a vast number of variations exist. The example implementation or implementations described herein are not intended to limit the scope, applicability, or configuration of the invention in any way. Rather, the foregoing detailed description will provide those skilled in the art with a convenient road map for implementing the described implementation or implementations.

Conclusion

Although the subject matter has been described in language specific to structural features and/or methodological acts, the subject matter defined in the appended claims is not necessarily limited to the specific features or acts. While specific implementations have been illustrated and described herein, as noted above, many changes can be made without departing from the spirit and scope of the claims. Accordingly, the scope of the claims should not be limited by the disclosure of the specific implementations set forth above.

What is claimed is:

1. A method comprising:
   receiving a data packet from a sensor;
   attaching a time tag to the data packet;
   computing a filtered pseudo-period for the sensor;
   determining a data crossover distortion condition between two or more sensors; and
   removing the data crossover distortion condition.

2. The method of claim 1, further comprising removing time tag jitter from the data packet received from the sensor.

3. The method of claim 1, further comprising computing a reference time tag using the filtered pseudo-period.

4. The method of claim 1, further comprising computing a preliminary time tag estimate by adding the filtered pseudo period to a previous time tag estimate.

5. The method of claim 1, wherein the computing a filtered pseudo-period further comprises:
   determining a difference between a current time tag and a reference time tag;
   computing a limited pseudo-period; and
   filtering the limited pseudo period to determine the filtered pseudo-period.

6. The method of claim 1, wherein the removing time tag jitter further comprises converging a time tag estimate with a reference time using a tracking filter.

7. The method of claim 1, wherein determining a data crossover condition further comprises:
   determining a difference between at least two time tags to calculate a collision residual, each time tag being associated with a different sensor;
   computing a crossover window value;
   determining the collision residual to be less than a crossover window size;
   applying a crossover hold, the crossover hold being an interruption of processing of data packets;
   decrementing the crossover hold; and
   evaluating crossover hold being greater than zero.

8. The method of claim 7, wherein the computing a crossover window size further comprises:
   differencing a current time tag of at least two sensors to calculate a $\Delta t$;
   comparing the $\Delta t$ with a value $Win_{big}$;
   comparing the $\Delta t$ plus the period of at least one sensor with the value $Win_{big}$; and
   computing the crossover window size as a function of a crossover count value and a window size parameter.

9. The method of claim 1, wherein the removing the data crossover condition further comprises:
   equating a time tag estimate to a preliminary time tag estimate; and
   propagating the time tag estimate using the filtered pseudo period.

10. The method of claim 1, further comprising initializing at least one sensor and a filtering algorithm.

11. A system comprising:
    a plurality of sensors outputting data at an asynchronous periodic rate;

a data control system, having a time tag module that applies a time tag to data received at the data control system; and a filtering module that executes a filter, together the data control system and the filtering module being configured to remove time tag jitter and crossover distortion of the data received at the data control system.

12. The system of claim 11, wherein each sensor of the plurality of sensors includes a clock module, the clock module measures timing of data collection and transmission.

13. The system of claim 11, further comprising an aircraft in which the plurality of sensors, the data control system, and the filtering module are installed to remove time tag jitter and crossover distortion from twist or deflection measurement data of an aircraft.

14. The system of claim 11, wherein the data control system is configured to:

read sensor data streams;

apply time tags to the data based on a clock;

execute a conditioning algorithm to remove time tag jitter and crossover distortion; and make time tagged data available for use via a buffering module.

15. The system of claim 11, wherein the time tag module includes a time sync card, the time sync card configured to:

communicate with a processor bus; and access a sync pulse.

16. The system of claim 11, wherein the data control system further comprises a non-real-time operating system.

17. A method comprising:

receiving, at a data control system, a first data stream and a second data stream;

distributing the first data stream and the second data stream into a buffer;

attaching an estimated time tag to each data stream, wherein the time tag is correlated to a clock time;

determining a data crossover distortion condition between the first data stream and the second data stream;

removing crossover distortion from the first and second data stream; and converging a time tag estimate with a reference time using a tracking filter to remove time tag jitter from the first and second data stream.

18. The method of claim 17, wherein the determining a data crossover distortion condition further comprises:

differencing at least two time tags to calculate a collision residual, wherein each time tag being associated with a different sensor;

computing a crossover window value;

determining the collision residual being less than a crossover window size;

applying a crossover hold, wherein the crossover hold being an interruption of processing of data packets;

decrementing the crossover hold; and evaluating crossover hold being greater than zero.

19. The method of claim 17, wherein the removing the data crossover condition further comprises:

equating a time tag estimate to a preliminary time tag estimate; and propagating the time tag estimate using the filtered pseudo period.

20. The method of claim 17, further comprising:

computing a filtered pseudo-period, comprising:

differencing a current time tag and a reference time tag;

computing a limited pseudo-period;

filtering the limited pseudo period to determine the filtered pseudo-period;

computing a reference time tag using the filtered pseudo-period; and computing a preliminary time tag estimate by adding the filtered pseudo period to a previous time tag estimate.

* * * * *